INVENTOR.
BRONISLAUS I. ULINSKI
BY A H Golden
ATTORNEY

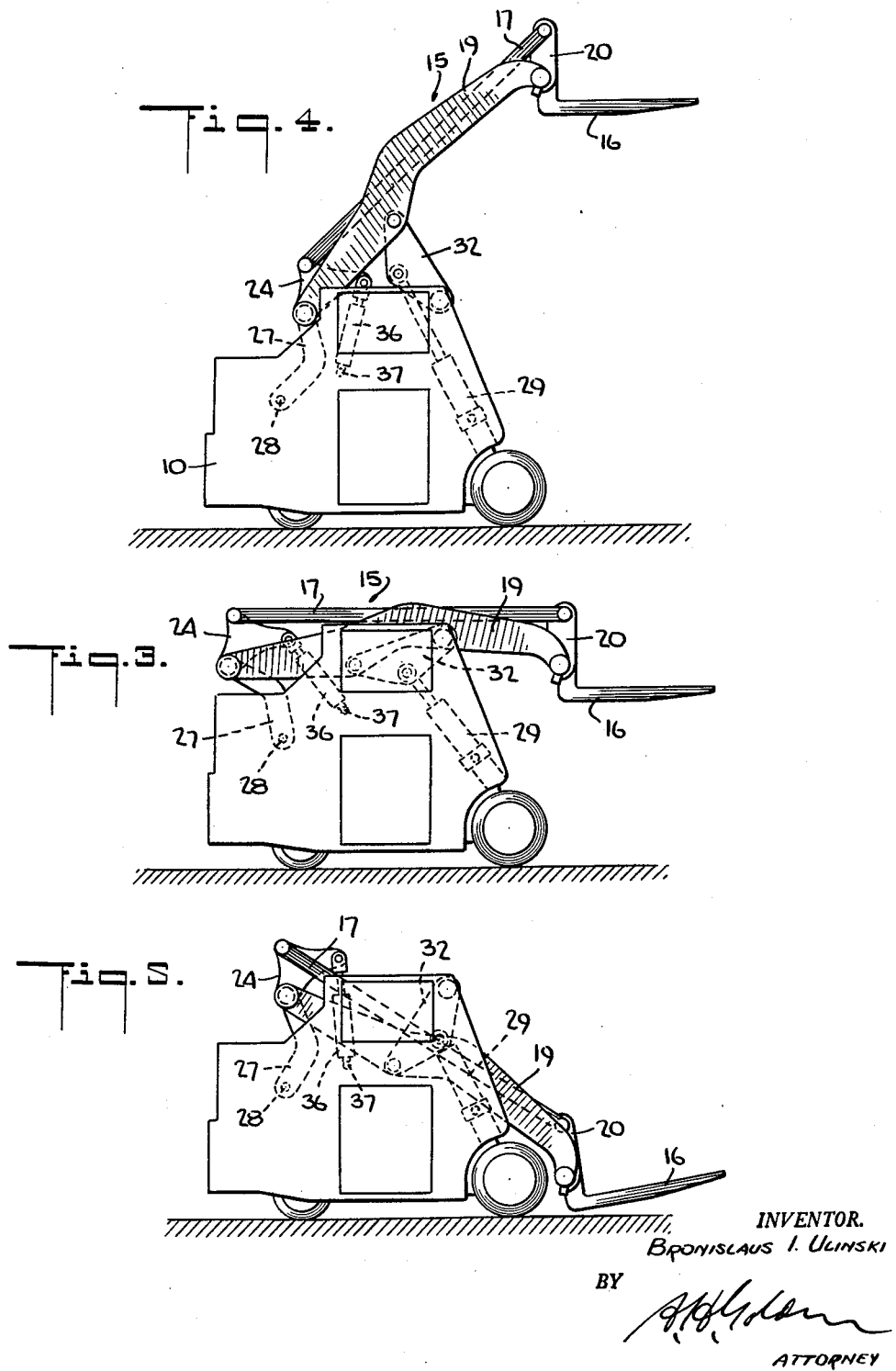

United States Patent Office 3,074,572
Patented Jan. 22, 1963

3,074,572
LEVER LIFT
Bronislaus I. Ulinski, Flossmoor, Ill., assignor to The Yale and Towne Manufacturing Company, Stamford, Conn., a corporation of Connecticut
Original application Dec. 3, 1957, Ser. No. 700,369, now Patent No. 2,953,264, dated Sept. 20, 1960. Divided and this application Feb. 25, 1960, Ser. No. 10,954
3 Claims. (Cl. 214—140)

This invention relates to industrial trucks, and, more particularly, to improvements in trucks employing leverage systems for elevating and lowering a load carriage.

This application is a division of my application Serial No. 700,369, filed December 3, 1957, now Patent No. 2,953,264, entitled "Industrial Truck," and is directed to the leverage system shown in the parent application by which a load carriage may be moved in a substantially vertical path and the carriage readily tilted in all vertical positions of the carriage.

In a sense the leverage system of this invention is an improvement in the leverage system shown in my copending application Serial No. 639,367, filed February 11, 1957, now Patent No. 2,980,271, and entitled "Lifting Mechanism for Industrial Truck," in that fewer parts are required. In accordance with the invention, fewer parts are required because of the novel arrangement wherein the ram means for tilting the load carriage are also used to form a part of the mounting structure which permits compensating movement of the load carriage supporting levers longitudinally of the truck so that the load carriage may be moved in a substantially vertical path by vertical swinging movement of the supporting levers. This eliminates two supporting arms and two tilting links provided in the leverage system shown in my application Serial No. 639,367. Beacuse of this reduction in the number of necessary parts, the use of the leverage system of the invention results in a saving of space in the truck and a reduction in fabrication and maintenance costs.

Other objects and advantages of the invention will become apparent from the following description when read in conjunction with the accompanying drawings wherein:

FIG. 3 is a side elevational view, similar to that of FIG. 1, but showing the load carriage partly elevated;

FIG. 4 is a side elevational view, similar to that of FIG. 1, but showing the load carriage fully elevated, and FIG. 5 is an elevational view, similar to that shown in FIG. 1, but showing the load carriage tilted from the horizontal position.

Figure 1:
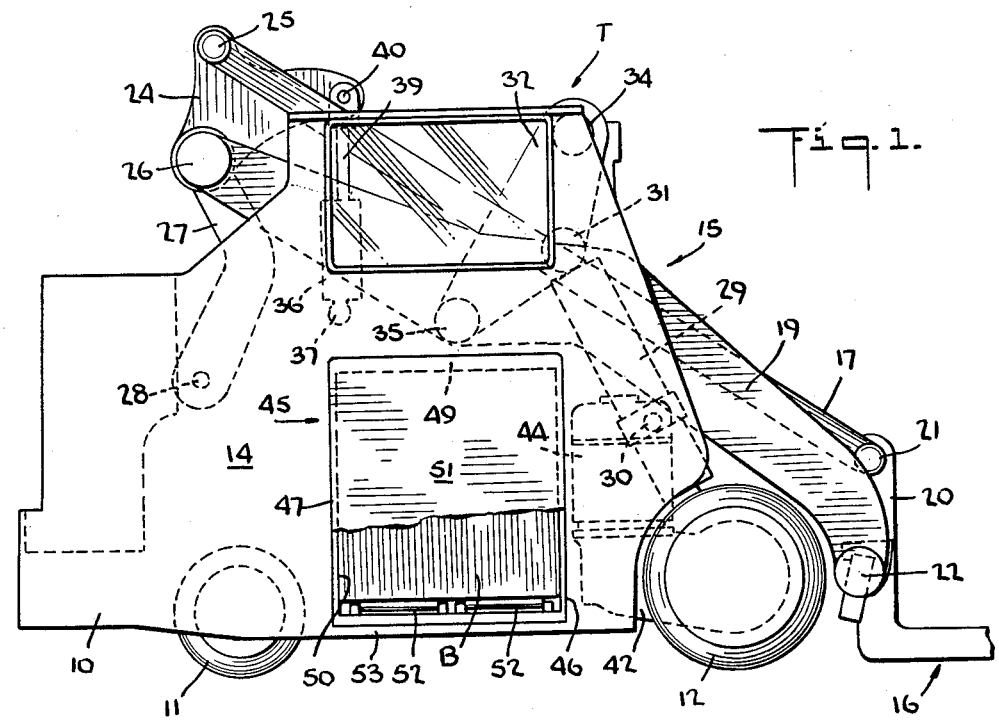
FIG. 1 is a side elevational view, partly broken away, illustrating a truck constructed in accordance with my invention.
Figure 2:
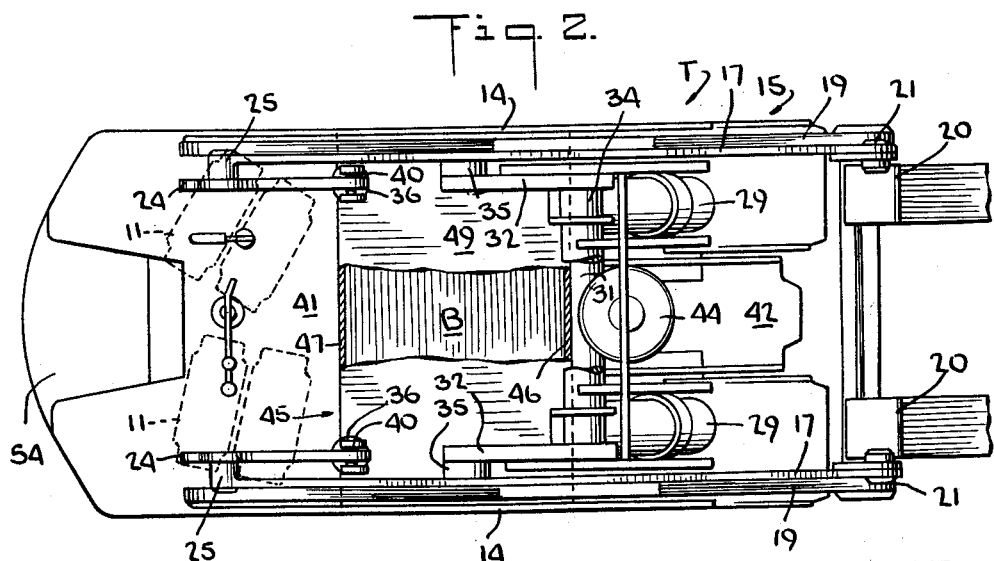
FIG. 2 is a top plan view, partly broken away, of the truck illustrated in FIG. 1.

Referring to the drawings, there is shown an electric powered industrial truck T having a main frame 10 supported by a pair of dual rear steering wheels 11 and a pair of front traction wheels 12.

The main frame 10 has a pair of spaced, vertical plates 14 disposed longitudinally at the side edges of the truck. These vertical plates serve to support a leverage system 15 that consists of an organization of levers and rams duplicated on each side of the truck and cooperating to control the lifting and lowering of a load carriage illustrated here as a fork 16.

Each of the organizations constituting the leverage system 15 comprises a pair of longitudinal levers 17 and 19 connected at thier forward ends to a vertical arm 20 by pivots 21 and 22, and at their rear ends to a crank arm 24 by pivots 25 and 26. The relationships of the pivots 21 and 25 to pivots 22 and 26, respectively, are identical so that the portion of the system described thus far is a parallel motion mechanism, as will be well understood by those skilled in the art.

The crank arm 24 is supported by the pivot 26 at the upper end of an upwardly extending arm 27 which is in turn supported by a pivot 28 on an upper rear portion of the adjacent vertical plate 14.

Each of the duplicate organizations constituting the leverage system 15 has a hydraulic ram 29 pivotally supported as at 30 at the forward portion of one of the vertical plates 14. This ram extends upwardly and has a piston rod connected by a pivot 31 to an intermediate portion of a bell-crank 32. One end of the bell-crank is connected to the upper forward portion of the plate 14 by pivot 34, while the other end of the bell-crank is connected to an intermediate part of the lever 19 by a pivot 35.

A second ram 36 is supported by a pivot 37 in spaced relationship to the pivot 28 on an upper rear portion of the plate 14 and has a piston rod 39 extending upwardly and pivoted at 40 to a forwardly extending portion of the crank arm 24 in the same spaced relationship with pivot 26 as that between pivots 37 and 28. As will be later described in more detail, the ram 36 and arm 27 support the crank arm 24 and the levers 17 and 19 for movement longitudinally of the truck so that the fork 16 may be moved in a substantially vertical path by vertical swinging movement of the levers 17 and 19 by operation of ram 29. This longitudinal movement of the crank arm 24 can be readily seen by comparison of FIGS. 1, 3 and 4. The ram 36 also serves to tilt the fork 16. As shown in FIG. 5, protraction of the piston rod 39 of the ram 36 serves to pivot or rotate the crank arm 24 relatively to arm 27 with resulting tilting of the fork 16 through levers 17 and 19.

In the lowered position of the fork 16, as illustrated in FIG. 1, the levers 17 and 19 of the leverage system 15, are supported by the plates 14 and extend downwardly from the upper rear portions of the plates, angularly forwardly of the traction wheels 12 in close relation to the plates. By reason of this arrangement, a large space 41 is provided between the plates 14 in the transverse direction, and between the wheels 11 and 12 in the longitudinal direction.

In the forward end of this space 41, and partially disposed between the front wheels, is a traction unit 42 including a motor 44. Just rearwardly of the motor 44 a compartment 45 is formed by vertical transverse bulkheads or partitions 46, 47 and a horizontal partition 49, each of which extends between the vertical plates 14. As will be seen in FIG. 1, the compartment 45 is positioned beneath the leverage system 15, but with the arm 27 and ram 29 extending downwardly from parts of the system and positioned rearwardly and forwardly of the compartment 45. The leverage system 15 then will allow access to the compartment 45, while supported through the pivots 28, 30 that may be placed at points below the top of the compartment. I then form an access opening 50 for the compartment in at least one of the vertical plates 14, with a removable closure 51 normally covering the opening.

For the purpose of illustration, I have chosen to show as my power source a battery B contained within the compartment 45, although it will readily be appreciated that any other source of power, such as a gas engine may be employed. For convenient installation and removal of the battery B, I provide a series of rollers 52, mounted on a floor plate 53 at the bottom of the compartment 45. It will be noted that when the battery is in operative position on the rollers 52, its bottom surface is at a level below a horizontal line extending rearwardly from the axis of rotation of the traction wheels 12. By maintaining the battery in such a low relation to the wheels and leverage system, I provide for full operation of the leverage system and great truck stability.

The main frame 10 extends rearwardly beyond the rear steering wheels 11 so that an operator's platform and control station 54 may be provided midway between the sides of the truck allowing an operator to have full forward vision between the duplicate sets of levers comprising the leverage system 15 and over the battery compartment 45.

To effect lifting movement of the leverage system from the position shown in FIG. 1, the piston rods of the rams 29 are protracted causing the bell-cranks 32 to rotate clockwise, as viewed, about the pivots 34. That rotation of bell-cranks 32 will elevate the levers 17 and 19, and the fork 16, about the pivots 25 and 26, as shown in FIGS. 3 and 4, and will at first cause a bodily rearward movement of the levers and fork through rearward swinging of the arm 27 on its pivot 28 and ram 36 on its pivot 37, as shown in FIG. 3, so that fork 16 will lift in substantially a straight line. Should the lifting be continued the straight line movement will be maintained through a forward swinging of arm 27 on its pivot 28 and the ram 36 on its pivot 37, as shown in FIG. 4. Conversely, retraction of the same piston rods lowers the fork 16 to the position shown in FIG. 1. The fork 16 may be tilted forwardly, or rearwardly, as shown in FIG. 5, at any level of elevation by retraction or protraction, respectively, of the piston rods 39 of the rams 36. These rams 36 also serve to hold the levers 17 and 19, and the fork 16 in any desired tilted position.

From the preceding description it can be seen that there is provided a novel leverage system by which a load carriage may be elevated and lowered in a substantially vertical path, and the load carriage tilted in all vertical positions thereof. The leverage system requires a minimum number of parts and the leverage system accordingly costs less to fabricate and maintain, and requires less space on the truck than systems heretofore proposed for providing similar functions.

While a specific embodiment of the invention has been shown and described, it will be appreciated that this is for the purpose of illustration and that changes and modifications may be made therein without departing from the spirit and scope of the invention.

I believe that the construction and operation of my novel industrial truck construction will now be understood, and that the advantages of my invention will be fully appreciated by those persons skilled in the art.

I now claim:

1. In a truck of the class described, a load carriage, a pair of levers each pivoted at one end thereof to said load carriage in spaced relationship, said pair of levers being pivoted at their opposite ends to an arm in the same spaced relationship to form a parallelogram comprising said pair of levers, said load carriage and said arm, means connected to said levers and to said truck for swinging said pair of levers vertically about their pivots on said arm whereby to effect lifting and lowering of said load carriage, a lever and a ram each pivoted at one end to said arm in spaced relationship and pivoted at their other ends to said truck in the same spaced relationship whereby said arm and said pair of levers may move bodily longitudinally of the truck by swinging movement of said ram and lever to permit said load carriage to be moved in a substantially straight line vertical path during vertical swinging movement of said pair of levers and whereby operation of said ram means will pivot said arm to tilt said load carriage, and a control link pivotally connected at one end to one of said pair of levers and pivotally connected at the other end to the truck, said control link being positioned relatively to said levers and said truck and being of a dimension between the connection thereof to said one of said pair of levers and the connection thereof to said truck that it effects bodily movement of said levers and arm through swinging movement of said ram and lever in a direction and to a degree that said load carriage is moved in a substantially vertical straight-line path as said pair of levers are raised and lowered.

2. In a truck of the class described, a load carriage, a pair of levers each pivoted at one end thereof to said load carriage in spaced relationship, said pair of levers being pivoted at their opposite ends to an arm in the same spaced relationship to form a parallelogram comprising said pair of levers, said load carriage and said arm, whereby said load carriage may be raised and lowered through vertical swinging movement of said pair of levers relatively to said arm while said load carriage is maintained in a particular angular position relatively to the truck, a lever and a ram each pivoted at one end to said arm in spaced relationship and pivoted at their other ends to said truck in the same spaced relationship whereby said arm and said pair of levers may move bodily longitudinally of the truck by swinging movement of said ram and lever to permit said load carriage to be moved in a substantially straight line vertical path by vertical swinging movement of said pair of levers and whereby operation of said ram means will pivot said arms to tilt said load carriage, a control link pivotally connected at one end to one of said pair of levers and at the other end to the truck, said control link being positioned relatively to said levers and said truck and being of a dimension between the connection thereof to said one of said pair of levers and the connection thereof to said truck that it effects bodily movement of said levers and arm through swinging movement of said ram and lever in a direction and to a degree that said load carriage is moved in a substantially vertical straight-line path as said pair of levers are raised and lowered, and ram means pivotally connected at one end to said truck and at the other end to said control link for pivoting said link to thereby simultaneously effect said vertical swinging movement of said pair of levers and said bodily longituidnal movement of said pair of lever arms.

3. In a truck of the class described, a load carriage, a pair of levers each pivoted at one end thereof to said load carriage in spaced relationship, said pair of levers being pivoted at their opposite ends to an arm in the same spaced relationship to form a parallelogram comprising said pair of levers, said load carriage and said arm, means for swinging said pair of levers vertically about their pivots on said arm whereby to effect lifting and lowering of said load carriage, a lever and a ram each pivoted at one end to said arm in spaced relationship and pivoted at their other ends to said truck in the same spaced relationship whereby said arm and said pair of levers may move longitudinally of the truck by swinging movement of said ram and lever to permit said load carriage to be moved in a substantially vertical straight line path by vertical swinging movement of said pair of levers and whereby operation of said ram means will pivot said arm to tilt said load carriage, and link means connected at one end to one of said pair of levers and at the other end to the truck, said link means being positioned relatively to said arms and said truck and being of a dimension between its connection with said one arm of said pair of arms and its connection with said truck that it effects bodily movement of said levers and arm through swinging movement of said ram and lever in a direction and to a degree that said load carriage is moved in a substantially vertical straight-line path as said pair of levers are raised and lowered.

References Cited in the file of this patent

UNITED STATES PATENTS

| 2,345,620 | Mork | Apr. 4, 1944 |
| 2,563,974 | Thierry | Aug. 14, 1951 |

FOREIGN PATENTS

| 129,142 | Sweden | Aug. 15, 1950 |